United States Patent
Wang

(10) Patent No.: US 9,025,552 B2
(45) Date of Patent: May 5, 2015

(54) CROSS-DOMAIN MULTI-MEDIA RESOURCE IDENTIFICATION SYSTEM AND METHOD THEREOF

(71) Applicant: Gemtek Technology Co., Ltd., Hsinchu (TW)

(72) Inventor: Wei Wang, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 292 days.

(21) Appl. No.: 13/781,784

(22) Filed: Mar. 1, 2013

(65) Prior Publication Data

US 2013/0322354 A1   Dec. 5, 2013

Related U.S. Application Data

(60) Provisional application No. 61/654,960, filed on Jun. 4, 2012.

(51) Int. Cl.
*H04W 8/02* (2009.01)
*H04L 12/24* (2006.01)
*H04L 12/28* (2006.01)

(52) U.S. Cl.
CPC .............. *H04W 8/02* (2013.01); *H04L 41/0853* (2013.01); *H04L 12/2809* (2013.01); *H04L 12/2812* (2013.01); *H04L 12/2832* (2013.01)

(58) Field of Classification Search
None
See application file for complete search history.

(56) References Cited

U.S. PATENT DOCUMENTS

| | | | |
|---|---|---|---|
| 2009/0210555 A1* | 8/2009 | Han et al. ...................... | 709/238 |
| 2009/0303926 A1* | 12/2009 | Den Hartog et al. ......... | 370/328 |
| 2012/0158900 A1* | 6/2012 | Kim et al. ..................... | 709/217 |
| 2013/0132595 A1* | 5/2013 | Cho et al. ..................... | 709/228 |

* cited by examiner

*Primary Examiner* — Chirag Shah
*Assistant Examiner* — Amar Persaud
(74) *Attorney, Agent, or Firm* — Jianq Chyun IP Office

(57) ABSTRACT

The invention provides a cross-domain multi-media resource identification system and a method thereof. The method includes: the first router transmits the first equipment list of the first LAN to the second router; the second router transmits the second equipment list of the second LAN to the first router; a first electronic device transmits a read request to the second router through the first router when the first electronic device in the first LAN intends to obtain a specific multi-media file of a second electronic device in the second LAN; the second router returns a text message file to the first router; the first router converts the specific internal internet address into an actual external internet address according to the text message file; the first electronic device plays the specific multi-media file according to the actual external internet address.

12 Claims, 3 Drawing Sheets

CROSS-DOMAIN MULTI-MEDIA RESOURCE IDENTIFICATION SYSTEM AND METHOD THEREOF

CROSS-REFERENCE TO RELATED APPLICATION

This application claims the priority benefits of U.S. provisional application Ser. No. 61/654,960, filed on Jun. 4, 2012. The entirety of the above-mentioned patent application is hereby incorporated by reference herein and made a part of this specification.

BACKGROUND OF THE INVENTION

1. Field of the Invention

The invention relates to a cross-domain multi-media resource identification system and a method thereof, more particularly to a cross-domain multi-media resource identification system and a method adapted to identify an actual external internet address of a multi-media resource through an identifiable domain name.

2. Description of Related Art

Universal plug and play (UPnP) protocol is an internet protocol proposed by UPnP™ Forum, said protocol is aim to allow various devices to share data, communications and multi-media resources in a home network to connect to each other while simplifying implementation of related network settings.

However, since a range planned by UPnP protocol only includes an internal local area network (LAN) in the home network, thus, in case of a cross-domain, it cannot be determined whether a data content being browsed is belonged to the internal LAN in other home network. As a result, a confusion to whether the data content belongs to the internal LAN or an external network may occur. Accordingly, a cross-domain data may unable to be browsed normally.

SUMMARY OF THE INVENTION

The invention proposes a cross-domain multi-media resource identification system, adapted to correctly identify an external internet address when a multi-media resource is shared in different domains. The cross-domain multi-media resource identification system includes a first router and a first digital over-the-top content box (OTT-BOX) disposed in a first local area network (LAN), and a second router and a second digital OTT-BOX disposed in a second LAN. In which, the first LAN is communicated with the second LAN through a wireless network tunnel. The first OTT-BOX is connected to the first router to establish a first equipment list having an internal internet address and a device name of at least one electronic device supporting universal plug and play (UPnP) protocol in the first LAN. The second OTT-BOX is connected to the second router to establish a second equipment list having an internal internet address and a device name of at least one electronic device supporting universal plug and play (UPnP) protocol in the second LAN. First, the first digital OTT-BOX accesses a second identification number of the second router; the first router transmits the first equipment list to the second router, and the second router transmits the second equipment list provided from the second digital OTT-BOX to the first router according to the second identification number. A first electronic device transmits a read request to the second router through the first router when the first electronic device in the first LAN intends to obtain a specific multi-media file of a second electronic device in the second LAN. The second router returns a text message file to the first router according to the read request; and the first electronic device connects to the second LAN according to the text message file to play the specific multi-media file.

According to an embodiment of the invention, in which the text message file includes the second identification number of the second router, a specific internal internet address of the second electronic device corresponding to the second router, a specific device name of the second electronic device and a file name of the specific multi-media file; the first router converts the specific internal internet address into an actual external internet address according to the text message file; the first electronic device connects to the second LAN according to the actual external internet address to play the specific multi-media file.

According to an embodiment of the invention, the actual external internet address is composed by a domain name and the file name of the specific multi-media file, and the domain name includes the second identification number corresponding to the second router and the specific device name of the second electronic device.

According to an embodiment of the invention, the first electronic device connects the second LAN according to the actual external internet address to play the specific multi-media file by using the second router to convert the actual external internet address back to the specific internal internet address of the second electronic device corresponding to the second LAN, and control the corresponding second electronic device to provide the specific multi-media file for the first electronic device to play.

According to an embodiment of the invention, the cross-domain multi-media resource identification system further includes the first digital OTT-BOX through a connection of the wireless network tunnel establishes the second equipment list in a first storage unit of the first digital OTT-BOX, and the second digital OTT-BOX through a connection of the wireless network tunnel establishes the first equipment list in a second storage unit of the second digital OTT-BOX.

According to an embodiment of the invention, in which the first digital OTT-BOX accesses the second identification number of the second router by adding the second identification number to a white list of a first router access module in the first digital OTT-BOX.

The invention proposes a cross-domain multi-media resource identification method, adapted to correctly identify an external internet address when a multi-media resource is shared in different domains. In which, a first router and a first digital over-the-top content box (OTT-BOX) connected to the first router are disposed in a first local area network (LAN), a second router and a second digital OTT-BOX connected to the second router are disposed in a second LAN. In addition, the first LAN is communicated with the second LAN through a wireless network tunnel. The cross-domain multi-media resource identification method includes the following steps. Establishing a first equipment list having an internal internet address and a device name of at least one electronic device supporting universal plug and play (UPnP) protocol in the first LAN by using the first digital OTT-BOX; establishing a second equipment list having an internal internet address and a device name of the at least one electronic device supporting UPnP protocol in the second LAN by using the second digital OTT-BOX; accessing a second identification number of the second router by using the first digital OTT-BOX; transmitting the first equipment list to the second router by using the first router, and transmitting the second equipment list provided from the second digital OTT-BOX to the first router by using the second router according to the second identification number; transmitting a read request to the second router through the first router by using a first electronic device when the first electronic device in the first LAN intends to obtain a specific multi-media file of a second electronic device in the second LAN; returning a text message file to the first router by using the second router according to the read request; and playing the specific multi-media file by connecting the first electronic device to the second LAN according to the text message file.

According to an embodiment of the invention, in which the text message file includes the second identification number of the second router, a specific internal internet address of the second electronic device corresponding to the second router, a specific device name of the second electronic device and a file name of the specific multi-media file; the first router converts the specific internal internet address into an actual external internet address according to the text message file; and the first electronic device connects to the second LAN according to the actual external internet address to play the specific multi-media file.

Based on above, the invention provides a cross-domain multi-media resource identification system and a method thereof to add a device name of a remote equipment, a unique identification number of a router and a name of a specific multi-media file to a end of a text message file replied from the remote equipment, on a basis of a message obtained from the remote equipment through the wireless network tunnel. A local router may convert information included in the text message file into an actual external internet address which is identifiable.

To make the above features and advantages of the invention more comprehensible, several embodiments accompanied with drawings are described in detail as follows.

DESCRIPTION OF THE EMBODIMENTS

Figure 1A:
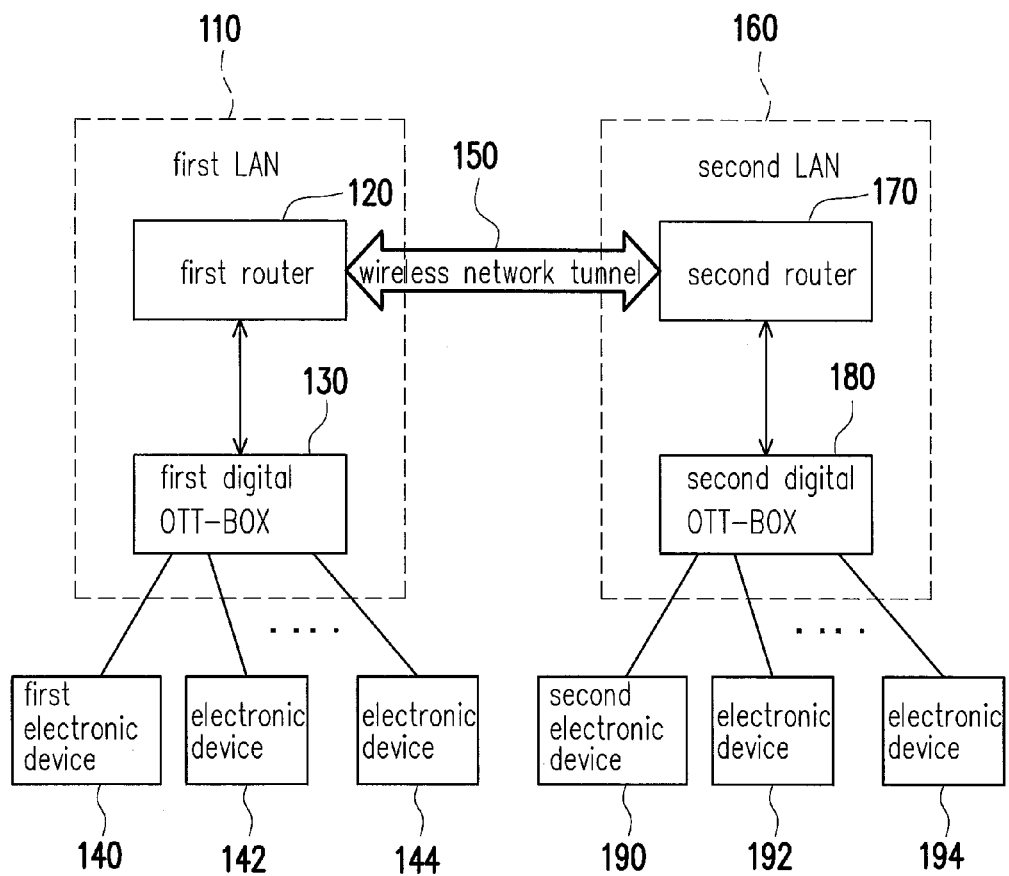
FIG. 1A is a functional block diagram of a cross-domain multi-media resource identification system according to an embodiment of the invention.

FIG. 1A is a functional block diagram of a cross-domain multi-media resource identification system according to an embodiment of the invention. A first local area network (LAN) 110 is communicated with a second LAN 160 through a wireless network tunnel 150. The cross-domain multi-media resource identification system exchanges a first equipment list in the first LAN 110 with a second equipment list in the second LAN 160 through the wireless network tunnel 150. The first LAN 110 includes a first router 120, a first digital over-the-top content box (OTT-BOX) 130 and a plurality of electronic devices (e.g., a first electronic device 140, electronic devices 142 and 144 as illustrated in FIG. 1A) connected to the first digital OTT-BOX 130. In which, the first router 120 has a first identification number, and the first router 120 and the first digital OTT-BOX 130 are connected to one another. The second LAN 160 includes a second router 170, a second digital OTT-BOX 180 and a plurality of electronic devices (e.g., a second electronic device 190, electronic devices 192 and 194 as illustrated in FIG. 1A) connected to the second digital OTT-BOX 180. In which, the second router 170 has a second identification number, and the second router 170 and the second digital OTT-BOX 180 are connected to one another. According to the present embodiment of the invention, the first LAN 110 may be deemed as a home LAN of one specific home, whereas the second LAN 160 may be deemed as a home LAN of another home. Said electronic device supports universal plug and play (UPnP) protocol, which may include, for example, a network IP camera, a network-attached storage (NAS), a network power controller, a DLNA digital media server (DLNA DMS) or a DLNA digital media renderer (DLNA DMR) supporting UPnP protocol.

Figure 2:
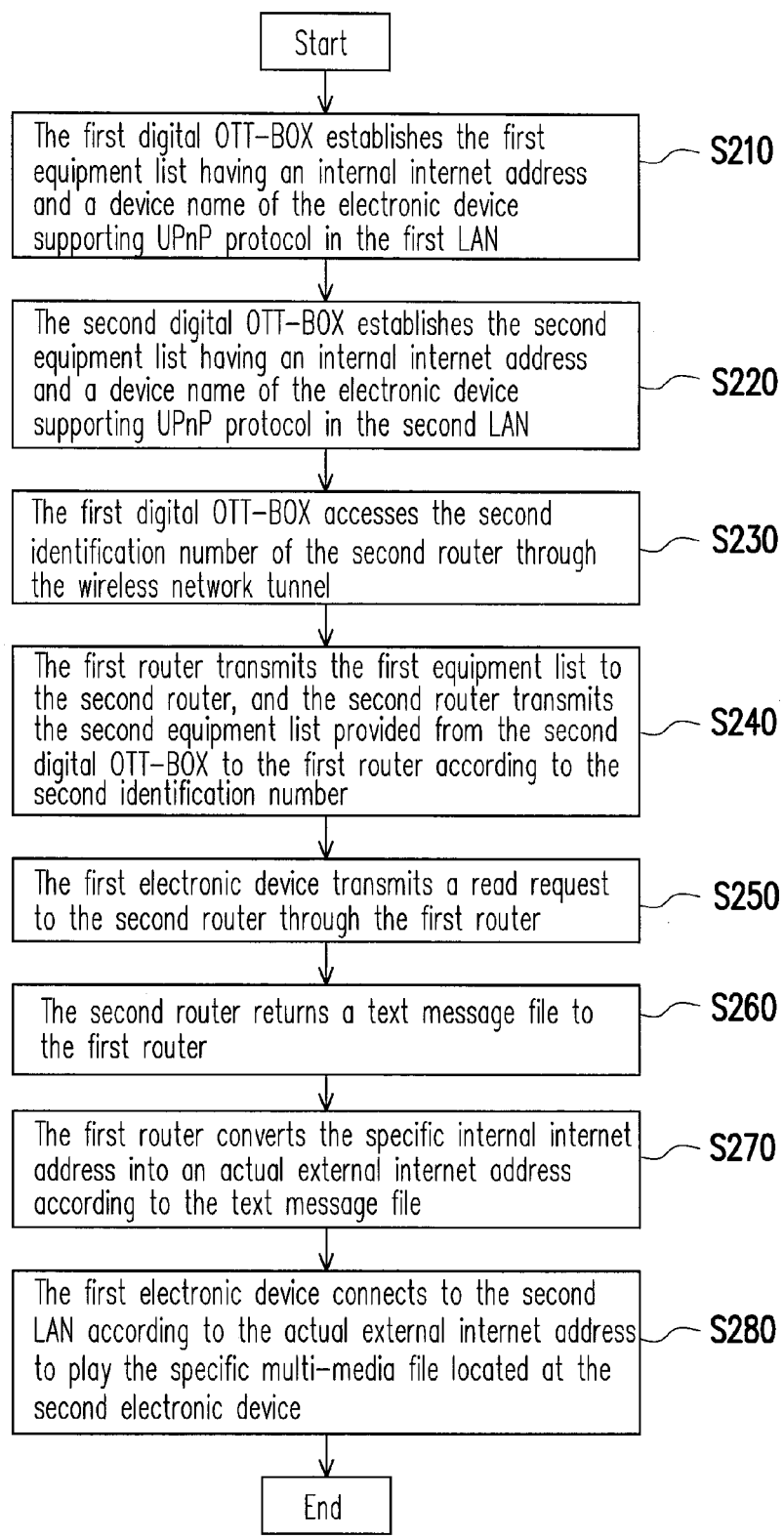
FIG. 2 is a flowchart of a cross-domain multi-media resource identification method according to an embodiment of the invention.

FIG. 2 is a flowchart of a cross-domain multi-media resource identification method according to an embodiment of the invention. Referring to FIG. 1A and FIG. 2 together. First, the first digital OTT-BOX 130 scans the first LAN 110 and establishes the first equipment list having an internal internet address and a device name of the electronic device supporting UPnP protocol (e.g., the first electronic device 140, the electronic devices 142 and 144) in the first LAN 110 (step S210). The second digital OTT-BOX establishes the second equipment list having an internal internet address and a device name of the electronic device supporting UPnP protocol (e.g., the second electronic device 190, the electronic devices 192 and 194) in the second LAN 160 (step S220).

Next, the first digital OTT-BOX 130 accesses the second identification number of the second router 170 through the wireless network tunnel 150 (step S230). The first router 120 transmits the first equipment list to the second router 170, and the second router 170 transmits the second equipment list provided from the second digital OTT-BOX 180 to the first router 120 according to the second identification number (step S240). In other words, in step S240, the first LAN 110 and the second LAN 160 has exchanged their equipment lists to one another.

The first electronic device 140 transmits a read request to the second router 170 through the first router 120 when the first electronic device 140 in the first LAN 110 intends to obtain a specific multi-media file of a second electronic device 190 in the second LAN 160 (step S250). The second router 170 returns a text message file to the first router 120 according to the read request (step S260). In which, the text message file includes the second identification number of the second router 170, a specific internal internet address of the second electronic device 190 corresponding to the second router 170, a specific device name of the second electronic device 190 and a file name of the specific multi-media file, and the text message file may be of a eXtensible Markup Language (XML) format. The first router 120 converts the specific internal internet address into an actual external internet address according to the text message file (step S270). The actual external internet address is composed by a domain name and the file name of the specific multi-media file, and the domain name includes the second identification number corresponding to the second router 170 and the specific device name of the second electronic device 190.

For instance, in case when the second identification number of the second router 170 being 3114 and the specific device name of the second electronic 190 being "NAS: Mediabolic Media Server", the domain name being defined according to the method of the invention is:

NASMediabolicMediaServer-3114.XXXXXXservice.com

In which a preset string "XXXXXX" may be a manufacturer name or a factory model, the preset string "XXXXXX" may also be utilized to ensure whether the wireless network tunnel 150 may be established between the first router 120 and the second router 170. Based on the domain name together with the file name of the specific multi-media file (e.g., ElVA_MissELVA.mp4), the actual external internet address may be converted completely as shown below:

http://NASMediabolicMediaServer-3114.XXXXXX service.com:9001/mshare/3/30002:62:primary/ %5bMP%5d%28720p%29ElVA_MissELVA.mp4

Next, the first electronic device 140 (e.g., a multi-media player) connects to the second LAN 160 according to the actual external internet address to play the specific multi-media file (step S280). In step S280, the second router 170 may also convert the actual external internet address back to the specific internal internet address of the second electronic device 190 corresponding to the second LAN 160, and the second router 170 may control the corresponding second electronic device 190 to provide the specific multi-media file for the first electronic device 140 to play. In other words, by using said converting mechanism, the first router 120 may easily identify the actual external internet address of the specific multi-media file through the domain name, so as to obtain the data through connection.

Figure 1B:
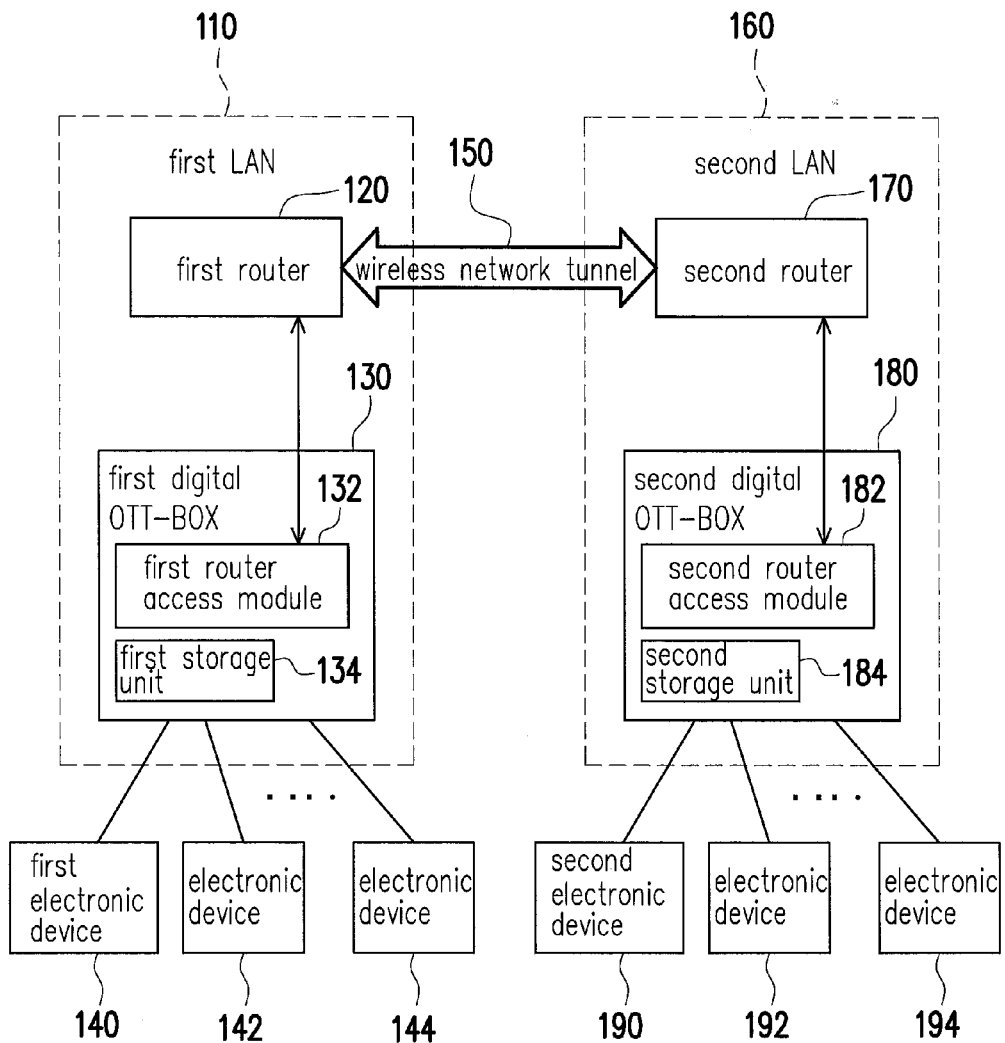
FIG. 1B is a functional block diagram of another cross-domain multi-media resource identification system according to an embodiment of the invention.

FIG. 1B is a functional block diagram of another cross-domain multi-media resource identification system according to an embodiment of the invention. The present embodiment is an altered embodiment of FIG. 1A which may also perform the steps S210 to S280 described above. Most of the components in the present embodiment is identical to the same as in FIG. 1A, thus only the difference between the two are described and the related description to the same components are omitted hereinafter. In the embodiment as illustrated in FIG. 1B, in step S230, the method for the first digital OTT-BOX 130 to access the second identification number of the second router 170 may be implemented by adding the second identification number to a white list of a first router access module (RAM) 132 in the first digital OTT-BOX 130. In other words, regrading the method for the second digital OTT-BOX 180 to access the first identification number of the first router 120, which may be implemented by adding the first identification number to a white list of a second RAM 182 in the second digital OTT-BOX 180. In addition, the embodiment in FIG. 1B further includes the first digital OTT-BOX 130 through a connection of the wireless network tunnel 150 establishes the second equipment list in a first storage unit 134 of the first digital OTT-BOX 130, and the second digital OTT-BOX 180 through a connection of the wireless network tunnel 150 establishes the first equipment list in a second storage unit 184 of the second digital OTT-BOX 180. As a result, users in the LAN 110 may access the second equipment list in the second LAN 160, so as to directly be informed of all the electronic devices (the second electronic device 190, the electronic devices 192 and 194) connected to the second digital OTT-BOX 180 in the second LAN 160. As such, the users in the first LAN 110 may easily access various multi-media resources in the second LAN 160 through the wireless network tunnel 150.

In view of above, the invention provides a cross-domain multi-media resource identification system and a method thereof to add a device name of a remote equipment, a unique identification number of a router and a name of a specific multi-media file to a end of a text message file replied from the remote equipment, on a basis of a message obtained from the remote equipment through the wireless network tunnel. A local router may convert information included in the text message file into an actual external internet address which is identifiable. As a result, whether the specific multi-media file belongs to a home network or a distance network may be clearly identified by the home network, so as to correctly play said multimedia resources on the terminal equipments (television, computer device, pad computer or hand-held device) in the home network.

Lastly, it should be noted that, the above embodiments merely serve as examples in the present embodiment, the invention is not limited thereto. Despite that the invention has been described with reference to above embodiments, it will be apparent to those skilled in the art that various modifications and variations can be made to the structure of the technical content disclosed in above embodiments of the invention without departing from the scope or spirit of the invention. In view of the foregoing, it is intended that the invention cover modifications and variations of this invention provided they fall within the scope of the following claims and their equivalents.

What is claimed is:

1. A cross-domain multi-media resource identification system configured to correctly identify an external internet address when a multi-media resource is shared in different domains, comprising:
a first router having a first identification number disposed in a first local area network (LAN);
a first digital over-the-top content box (OTT-BOX) connected to the first router to establish a first equipment list having an internal internet address and a device name of at least one electronic device supporting universal plug and play (UPnP) protocol in the first LAN;
a second router having a second identification number disposed in a second LAN, wherein the first LAN is communicated with the second LAN through a wireless network tunnel; and
a second digital OTT-BOX connected to the second router to establish a second equipment list having an internal internet address and a device name of at least one electronic device supporting UPnP protocol in the second LAN, wherein the first digital OTT-BOX accesses the second identification number of the second router; the first router transmits the first equipment list to the second router, and the second router transmits the second equipment list provided from the second digital OTT-BOX to the first router according to the second identification number; a first electronic device transmits a read request to the second router through the first router when the first electronic device in the first LAN requests access to obtain a specific multi-media file of a second electronic device in the second LAN; the second router returns a text message file to the first router according to the read request; and the first electronic device connects to the second LAN according to the text message file to play the specific multi-media file.

2. The cross-domain multi-media resource identification system of claim 1, wherein the text message file comprises the second identification number of the second router, a specific internal internet address of the second electronic device corresponding to the second router, a specific device name of the second electronic device and a file name of the specific multi-media file; the first router converts the specific internal internet address into an actual external internet address according to the text message file; the first electronic device connects to the second LAN according to the actual external internet address to play the specific multi-media file.

3. The cross-domain multi-media resource identification system of claim 1, wherein the actual external internet address is composed by a domain name and the file name of the specific multi-media file, and the domain name comprises the second identification number corresponding to the second router and the specific device name of the second electronic device.

4. The cross-domain multi-media resource identification system of claim 2, wherein the first electronic device connects the second LAN according to the actual external internet address to play the specific multi-media file by using the second router to convert the actual external internet address back to the specific internal internet address of the second electronic device corresponding to the second LAN, and control the corresponding second electronic device to provide the specific multi-media file for the first electronic device to play.

5. The cross-domain multi-media resource identification system of claim 1, further comprising the first digital OTT-BOX through a connection of the wireless network tunnel establishes the second equipment list in a first storage unit of the first digital OTT-BOX, and the second digital OTT-BOX through a connection of the wireless network tunnel establishes the first equipment list in a second storage unit of the second digital OTT-BOX.

6. The cross-domain multi-media resource identification system of claim 1, wherein the first digital OTT-BOX accesses the second identification number of the second router by adding the second identification number to a white list of a first router access module in the first digital OTT-BOX.

7. A cross-domain multi-media resource identification method configured to correctly identify an external internet address when a multi-media resource is shared in different domains, wherein a first router having a first identification number and a first digital over-the-top content box (OTT-BOX) connected to the first router are disposed in a first local area network (LAN), a second router having a second identification number and a second digital OTT-BOX connected to the second router are disposed in a second LAN, the first LAN is communicated with the second LAN through a wireless network tunnel, and the method comprising:
    establishing a first equipment list having an internal internet address and a device name of at least one electronic device supporting universal plug and play (UPnP) protocol in the first LAN by using the first digital OTT-BOX;
    establishing a second equipment list having an internal internet address and a device name of the at least one electronic device supporting UPnP protocol in the second LAN by using the second digital OTT-BOX;
    accessing the second identification number of the second router by using the first digital OTT-BOX;
    transmitting the first equipment list to the second router by using the first router, and transmitting the second equipment list provided from the second digital OTT-BOX to the first router by using the second router according to the second identification number;
    transmitting a read request to the second router through the first router by using a first electronic device when the first electronic device in the first LAN requests access to obtain a specific multi-media file of a second electronic device in the second LAN;
    returning a text message file to the first router by using the second router according to the read request; and
    playing the specific multi-media file by connecting the first electronic device to the second LAN according to the text message file.

8. The cross-domain multi-media resource identification method of claim 7, wherein the text message file comprises the second identification number of the second router, a specific internal internet address of the second electronic device corresponding to the second router, a specific device name of the second electronic device and a file name of the specific multi-media file, the step of playing the specific multi-media file by connecting the first electronic device to the second LAN according to the text message file further comprising:
    converting the specific internal internet address into an actual external internet address by using the first router according to the text message file; and
    playing the specific multi-media file by connecting the first electronic device to the second LAN according to the actual external internet address.

9. The cross-domain multi-media resource identification method of claim 8, wherein the actual external internet address is composed by a domain name and the file name of the specific multi-media file, and the domain name comprises the second identification number corresponding to the second router and the specific device name of the second electronic device.

10. The cross-domain multi-media resource identification method of claim 8, wherein the step of playing the specific multi-media file by connecting the first electronic device to the second LAN according to the actual external internet address further comprising:
    converting the actual external internet address back to the specific internal internet address of the second electronic device corresponding to the second LAN by using the second router; and
    controlling the corresponding second electronic device by using the second router to provide the specific multi-media file for the first electronic device to play.

11. The cross-domain multi-media resource identification method of claim 7, further comprising:
    the first digital OTT-BOX through a connection of the wireless network tunnel establishes the second equipment list in a first storage unit of the first digital OTT-BOX; and
    the second digital OTT-BOX through a connection of the wireless network tunnel establishes the first equipment list in a second storage unit of the second digital OTT-BOX.

12. The cross-domain multi-media resource identification method of claim 7, wherein the step of accessing the second identification number of the second router by using the first digital OTT-BOX further comprises adding the second identification number to a white list of a first router access module in the first digital OTT-BOX.

* * * * *